3,431,331
ANTICLOGGING BREATHABLE MOLD
AND METHOD
Seymour Pincus, Brooklyn, and Edwin G. Krakauer, Roslyn Heights, N.Y., assignors to Kay Manufacturing Corp., a corporation of New York
Filed Feb. 16, 1965, Ser. No. 433,090
U.S. Cl. 264—45                                15 Claims
Int. Cl. B29d 27/00

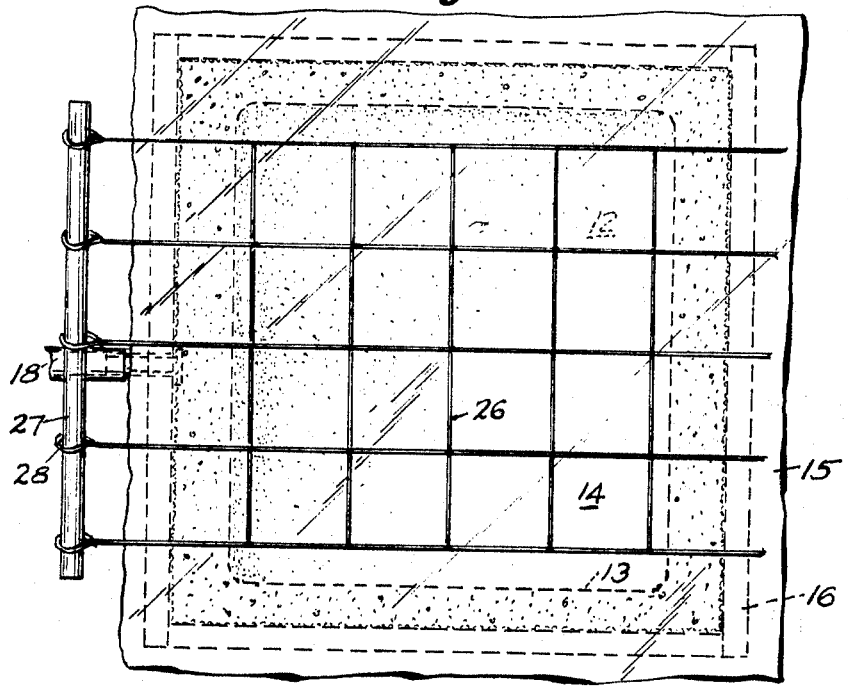
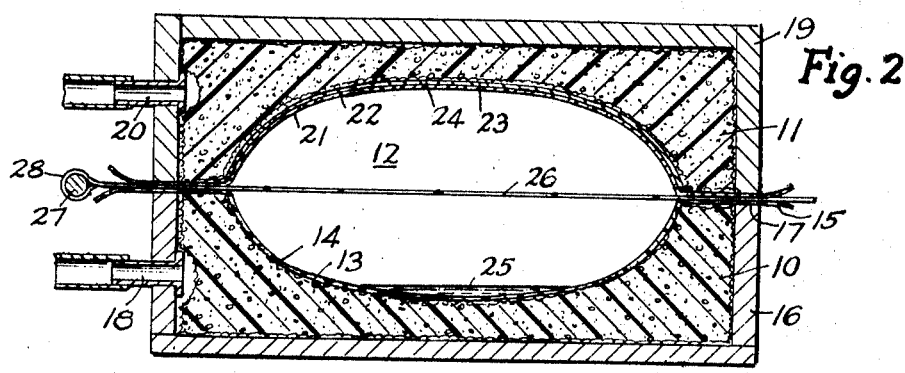
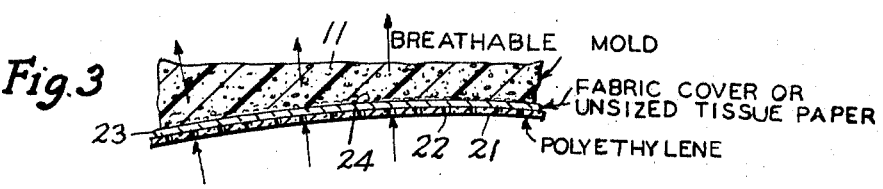

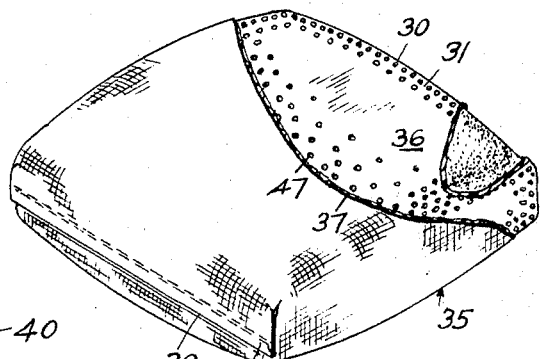
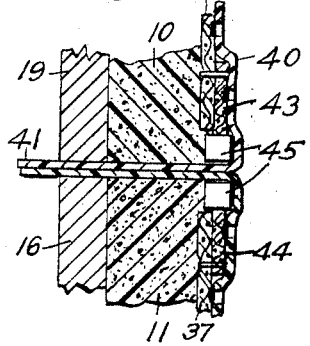
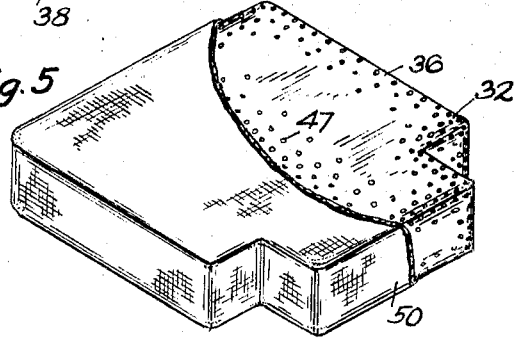
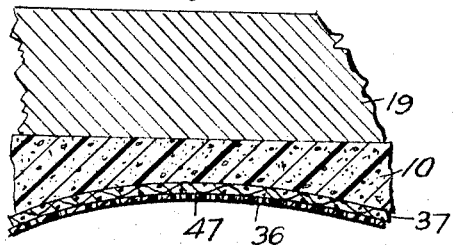
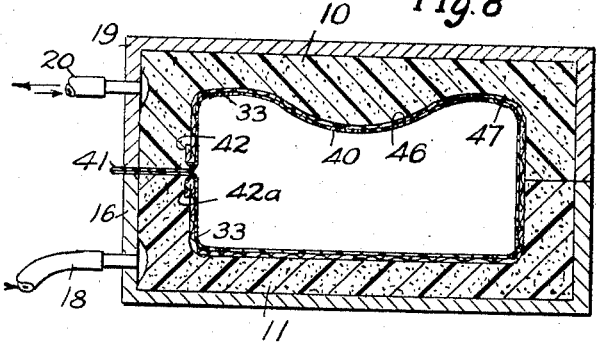
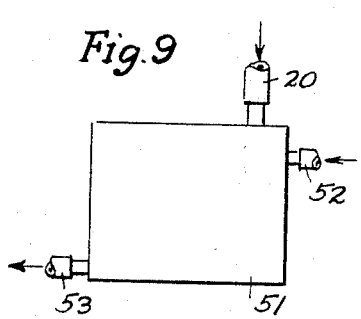
INVENTORS
Seymour Pincus
Edwin G. Krakauer United States Patent Office 3,431,331
Patented Mar. 4, 1969

ABSTRACT OF THE DISCLOSURE

The breathable mold is of the type permitting removal and transportation of the casting of polyurethane foam before curing and while still in the form of foam gel. The open cells of the foam mold are guarded against clogging by a thin perforated barrier sheet as of polyethylene. Most of the perforations through the sheet are small enough to vent the mold cavity and to bar the passage of polyurethane foam elastomer material through the sheet and into the cells. In addition and optionally, a sheet of absorbent paper may be interposed between the plastic sheet and the mold wall to absorb any chance material penetrating the small perforations. Large perforations are used in the sheet only when a cover is to be automatically attached to the plastic sheet during the molding operation. In that case, the cover replaces and is used instead of the paper sheet. The large perforations are made at selected spots and permit the passage of foam which coats and adheres to the cover but does not pass completely through the cover to clog the mold cells.

This invention relates to methods and apparatus for molding articles of one shot polyurethane foam in breathable molds, particularly to molds devoid of sprues or vents and relates to means and methods for the prevention of clogging of the breathable mold to insure maximum continued reuseability.

In known foam molding apparatus, escape means such as one or more sprue openings or a floating lid is provided for the escape from the cavity of displaced gaseous fluid.

Following the escape of such gaseous fluid from the cavity, the expanding one shot polyurethane foam often fills, or at least partly fills, the sprue openings or other escape passages communicating with the cavity and forms sprues or ribs. The excess foam material so formed is largely wasted, as is the labor required for trimming such excess, thereby adding materially to the cost of production of the finished molded article.

The foam adjacent to the planar edges of the sprues or the floating lid always forms a thickened layer of hard cells of higher density than and differing in character from the remainder of the molded article and usually detrimental thereto.

Consequently, it has been the practice in connection with molds which require sprues or floating lids to so design such molds that the nonuniform layer of hard cells generated at the escape edge become arranged adjacent a planar surface, at a point where the unwanted material would not become detrimental to the final product.

One of the objects of the present invention is the provision of a mold and method to obviate the expense incurred in controlling the problem of nonuniform hard cells mentioned, and to obviate the design limitations inherent in the problem.

Another object of the invention is the provision of a method of controlling the gaseous fluid produced in the foaming process so that only inexpensive localized air exhaust equipment is needed for that purpose.

The invention is further directed to the method of conducting air and gases out of the cavity of a breathable mold and through a relatively large area of the mold itself during the expansion of the one shot polyurethane foaming ingredients in the mold, with or without suction, the method comprising barring the still liquid foam from entrance into the wall of the cavity to confine the foam substantially to the cavity while permitting only the gaseous fluid in the cavity to enter and pass through said wall and out of the mold.

The invention is further directed to the provision of a method utilizing the relatively small amount of foam penetrating the foam barrier, for attaching during the molding process, cushion cover material adjacent the barrier, directly to the cast polyurethane foam cushion or the like, which method, on selection of the extent and positions and sizes of the areas of adhesive attachment, enables the retention of the desired flexible character and "feel" of the cover material.

The present invention is further directed to a sprueless molding apparatus employing a breathable mold through which the gaseous fluid in the mold cavity are displaced by expansion of the foam and are allowed to pass out of the mold cavity through a perforated release liner instead of the usual sprue opening or floating mold top or lid or other passage for escaping gaseous fluid.

The invention is further directed to a sprueless breathable mold wherein a suitable barrier is provided for barring the foam mass from the walls of the mold cavity to confine most of the mass to the cavity while permitting the escape of gaseous fluid through said walls, the barrier being adapted to cooperate with an absorbent sheet which may be substantially stripped from the barrier and the mold and which absorbs any viscous elastomer material reaching it, or which barrier is adapted to have a fabric cover sheet secured thereto by means of foam permitted to penetrate the barrier.

The various objects of the invention will be clear from the description which follows and from the drawings, in which:

FIG. 1 is a top plan view of the lower part of a typical breathable opened mold embodying the invention, the netlike supporting member for the foam gel being shown in place at the parting line of the mold.

FIG. 2 is a vertical sectional view taken on the line 2—2 of FIG. 1 showing also the upper part of the mold in position to close the mold cavity.

FIG. 3 is a fragmentary vertical sectional view, on a greatly enlarged scale, through the wall of the cavity in the upper part of the mold showing the perforated liner and an absorbent sheet for the foam in the proper positions thereof.

FIG. 4 is a perspective view of a typical furniture cushion molded by the apparatus and method of the present invention, showing a plastic liner having selected perforated areas and a fabric cover adhering to the plastic sheet, the liner and cover being partly broken away to show the interior cushion part.

FIG. 5 is a similar view of another form of cushion moldable with a foam-barring sheet and a cover.

FIG. 6 is a fragmentary vertical sectional view of the lined mold at the parting line, showing a zipper cover closure for the cover, whereby the zipper may readily be closed after the projecting part of the perforated plastic liner has been cut off.

FIG. 7 is a similar view of the high part of the lined mold cavity showing one arrangement of the perforations in the plastic liner.

FIG. 8 is a vertical sectional view of the mold showing the exhaust and air pressure conduits for gaseous fluid as well as another form of cushion, and showing the edge portions of the cover closure folded back on themselves.

FIG. 9 is a diagrammatic view of a trap or scrubber for the gaseous fluid exhausted from the mold.

Generally, the molding apparatus comprises not only a suitable breathable two part mold, but also a replaceable or expendible and temporary perforated plastic sheet liner or bag acting as a barrier to prevent newly formed foam from reaching and entering the cells of the mold, while permitting gaseous fluid to escape into the open air or into disposal apparatus. Optionally, a suitable net across the parting line of the mold serves as a suspension means whereby the newly molded article is transportable to a curing station.

Optionally also, an additional means may be employed to absorb or blot up any viscous elastomer material undesirably penetrating the small perforations of the plastic sheet, to prevent such material from entering the walls of the mold cavity. Or instead of an absorbent sheet, said additional means may take the form of a cushion cover or the like and the selected perforations in the plastic sheet accordingly dimensioned by being made large enough to permit some foam while still adhesive, to pass therethrough into contact with the cover. The perforations in that case are arranged at selected areas of the plastic sheet where it is desired to adhesively secure the cover to the plastic member.

It is known that polyurethane, such as that preferably used herein for molding, is a strong adhesive. By determining the arrangement and dimensions of the perforated areas of the plastic liner, or in other words, determining the number of the perforations, the spacings thereof, the diameters thereof, and the area of the liner over which the perforations are distributed, the spill therethrough of the foam, if any may be used for securing sheets or fabrics, textile or other, adhesively to the molded article at localized areas. By selecting and limiting the sizes and positions of the areas of adhesion, this invention opens the way for attaching covering materials to the molded article without adversely affecting said article to any significant extent and regardless of whether the surface of the article is flat, curved or undulating or otherwise shaped, the attachment being accomplished during the molding process and being applicable to articles varying greatly in sizes and shapes. Both lower cost and improved tailoring of the finished article are thereby achieved.

In that particular embodiment of the invention shown by way of example in FIGS. 1 to 3, the breathable mold comprises the lower part 10 preferably of semirigid polyurethane foam, having a substantial number of open cells, and a similar breathable upper part 11 mating with the lower part 10 to provide the mold cavity 12 therebetween. The wall 13 of the cavity in the lower part 10 is lined with a suitable preferably imperforate mold release liner 14 of suitable material such as polyethylene, which preferably projects beyond the cavity as at 15 a sufficient distance to insure the complete envelopment of the foam in cooperation with a similar, though perforated liner 21 for the cavity in the upper mold part. A suitable box-like mold support 16 for the mold part 10 is open at the top and terminates at its upper surface at the parting line 17 of the mold and is provided with the passage 18 communicating with the mold part 10 and with the liner 14. The upper mold part 11 is enclosed in a similar box-like mold support 19 also provided with a passage as 20 similar to the passage 18.

Means are provided for barring the foam from entrance into the walls of the cavity in the upper mold part 11 while permitting gaseous fluid to enter and to pass through said walls, said means serving also as a release liner for the work cast in the mold and also serving a third function after its temporary use as a foam barrier and release agent has been completed, namely, as part of the envelope in which the foam gel is enclosed for removal from the mold and transportation to a curing oven.

As shown, the plastic liner 21 for the upper part 11 is preferably finely perforated as at 22 at intervals spaced sufficiently closely to permit the gaseous fluid in the cavity 12 to be driven through the perforations 22 by the expanding foam while holding back or screening out the foam as the foam reaches the liner. The diameters of the perforations 22 are determined by the material of the liner, the surface tension, and the capillary attraction and repulsion and other pertinent characteristics thereof as will be understood, as well as the degree of vacuum or suction applied through the passages 18 and 20. When the foam spill is to be used as an adhesive, relatively large perforations are preferred as will be later explained. For a relatively thin sheet of polyethylene, the holes may be as small as 0.00025 inch in diameter or as large as about 0.25 inch at points where the escape of foam for adhesive purposes is desired.

Though the perforated liner is, in practice, efficient for the intended purpose, in order to make certain that the foam itself is prevented from entering the open cells at the wall 24 of the cavity in the upper mold part, as when the perforations 22 are of a relatively large diameter, a sheet 23 of inexpensive disposable absorbent material pervious to gaseous fluid, may optionally be interposed between the liner 21 and the wall 24 in the upper part of the mold cavity.

Preferably, the sheet 23, if used, is of unsized tissue paper, such as toilet tissue. Such paper is preferably absorbent serving to blot up any liquid which may have undesirably passed through the perforated liner, thereby protecting the cavity wall. The optional paper layer between the liner 21 and the cavity wall 24 while preventing clogging of the open cells of the breathable mold, does not prevent any suction, optionally applied to the passage 20, from holding the perforated mold release liner in place, and does not prevent the displacement of gaseous fluid past the liner 21 through said sheet 23 and through the upper mold part 11. It, therefore, becomes unnecessary to employ a sprue opening for the escape of such gaseous fluid, or in the case of a single mold part, to employ a floating lid on said part, or other escape opening. The paper layer adheres to the plastic sheet only at those few chance spots where viscous elastomer material penetrates the plastic sheet. The paper may readily be stripped off, leaving some paper fibers perhaps at said spots. The adhering paper may be allowed to remain on the plastic sheet because it is usually covered later when a covering is applied to the cushion.

It will be understood that suction may be applied to the passage 18, after the liner 14 has been stretched across the top of said mold part and shaped, at least in part, to fit the wall 13 and prior to the deposit of the liquid foaming ingredients 25 in the cavity, to hold the liner 14 in place. The suction may be continued after the mold is closed or may be omitted entirely as may be found convenient or desirable.

If desired and at the proper time, air pressure may be applied to the breathable mold parts through the passages 18 and 20 as when the finished article is to be removed from the mold cavity after the mold is opened.

The netting 26 is preferably arranged across the mold to project past the extending parts 15 of the liners 14 and 22 beyond the supports 16 and 19 so that when the mold is open the article of foam gel may be suspended from the netting and may be transported to the curing oven by suitable means engaging the holder 27 for the ends of the netting elements 28.

As hereinbefore indicated, in that form of the invention shown in FIGS. 4–8, it is intended that some of the newly expanded foam pass through suitably dimensioned and relatively large perforations 30 at selected areas as 31 (FIG. 4), 32 (FIG. 5) and 33 (FIG. 8) of the plastic liner, where it is desired to secure flexible cover material adhesively to the molded article while the article is being molded. In the finished cushion 35 of FIG. 4, the holes 31 are concentrated largely at the corner edges of the plastic liner 36 and are sufficiently large to permit the passage therethrough of limited predetermined amounts of foam. The cover material may be any suitable textile or other fabric or suitable flexible plastic fibers since it is unnecessary that the foam be absorbed by the cover, so long as the spilled foam reaches but does not penetrate the cover and does not reach the cells of the breathable mold parts 10 and 11.

The cover 37 is shown in a bag-like form with the closure 38 thereof closed by the flap 39 which may be loose or held in place by snap fasteners or other suitable means as is well known. To permit the liner 36 or 40 (FIG. 6) to be properly closed at the parting line of the mold, said liner extends as at 41 beyond the mold and the marginal portions 42 and 42a (FIG. 8) of the closure for the cover 46 are folded back on the adjacent part of the cover during the molding operation. In the form shown in FIG. 6, the marginal portions at the closure of the cover carry the zipper tapes 43 and 44 and the interlocking zipper fastener elements 45, the closure parts 41 of the liner extending along the mold parting line out of the mold.

In addition to the holes or perforations pervious to some extent to the foam for adhesive purposes as well as being pervious to gaseous fluid, relatively small perforations as 47 pervious to the gaseous fluid, but resistant to and substantially impervious to the passage of the foam, are made in the liner primarily at the high parts of the mold which the expanding foam reaches last, and are preferably concentrated there.

In the form shown in FIG. 5, the cover 50 has no bottom and merely covers the top and sides of the molded polyurethane cushion, and is secured adhesively to the perforated plastic liner 36 as above described.

While the liner has previously been described as comprising a perforated plastic sheet as 21 for the upper mold part and another sheet 14 for the lower mold part, it will be understood that the present invention is not limited to separate plastic liner sheets or to perforations in the upper part only of the liner. For example, as shown in FIG. 8, the liner may be in the form of a bag 40 open at the end 41 thereof and provided with perforations at any selected areas including the bottom. The foaming ingredients may be inserted into the bag after it has been inserted into the mold cavity as by means of a suitable nozzle, or before such insertion, the bag in the latter case being sealed before placement in the mold. The cover 46, like the cover 37, surrounds the plastic liner and is interposed between the liner and the wall of the mold cavity in a manner similar to the arrangement of the tissue 24. Unlike the absorbent tissue, which is substantially completely stripped away from the molded article, the cover remains in place and is transported to the curing oven, with the foam gel which is enclosed in the liner and with the net 26, where such net is used, the cover reinforcing the liner during such transportation.

By the use of a gas-escape perforated liner and a breathable mold, it becomes possible to dispose of the gaseous fluid in the mold, in a simple and inexpensive manner.

It will now be seen that there has been provided a breathable mold devoid of sprue openings, floating lids or other customary air escape openings, yet adequately breathable particularly by reason of the use of a multi-punctured liner which acts as a barrier for the foam at the upper part of the wall of the mold cavity; that maximum continued reuse of the mold is made possible by insuring additionally that clogging of the cells of the breathable mold is prevented as by the use of disposable blotting tissue interposed between the liner and the cavity wall; that the final foam product needs no trimming and no perceptible layer of hard nonuniform foam cells are generated; that finishing covering material may replace the tissue and become secured to the molded foam cushion during the molding operation and reinforces the liner during transport of the uncured foam gel; and that all the various objects of the invention have been adequately attained.

While certain specific forms of the invention have herein been shown and described, various obvious changes may be made therein without departing from the spirit of the invention defined in the appended claims.

We claim:

1. The method of molding a polyurethane foam cushion in a breathable and sprueless mold provided with an upper and a lower part each shaped to define part of a mold cavity and permeable to gaseous fluid, the method comprising preventing the clogging of the mold while permitting the escape of gaseous fluid out of the cavity during the molding operation by:

making perforations at selected points in a flexible plastic sheet, the perforations being small enough to prevent the passage therethrough of viscous elastomer material of the polyurethane foam type, inserting said plastic sheet into the mold cavity, shaping the sheet to conform to the shape of the walls of the cavity, inserting the foamable plastic ingredients of the cushion into the shaped perforated plastic sheet, expanding the ingredients to shape the resulting foam smoothly against the perforated sheet, while simultaneously venting the cavity only through the perforations in said sheet and through the breathable mold, and barring the viscous elastomer material of the foam from entering and clogging said mold by means of the plastic sheet.

2. The molding method of claim 1, and lining the wall of the cavity in the upper mold part with an additional flexible sheet prior to the insertion of the plastic perforated sheet into the cavity.

3. The molding method of claim 2, the additional sheet being of material adapted to absorb and to prevent the passage therethrough of the viscous elastomer material.

4. The method of claim 2, the additional sheet being of cushion covering material pervious to gaseous fluid, the plastic sheet, prior to the insertion thereof into the mold cavity, having additional relatively large perforations made therein at selected spots thereof, the additional perforations permitting the passage therethrough of limited amounts of the viscous material into contact with the surface of the additional sheet, and adhering the additional sheet to the plastic sheet by means of said viscous material at said spots.

5. The method of preventing the clogging, by polyurethane foam molded therein, of a multipart split breathable mold permeable to gaseous fluid, each part of the mold being shaped to define part of a mold cavity, the mold being of the type adapted to mold polyurethane foam therein and to have said polyurethane foam removed therefrom prior to the curing of the foam and while the foam is still in the form of foam gel, said method comprising venting the mold cavity by having the gaseous fluid contained in said cavity during the molding operation, escape through the mold, said venting being accomplished by:

perforating a thin plastic flexible sheet at selected points with perforations sufficiently small in diameter to prevent the passage therethrough of viscous elastometer material resulting from the molding operation and generated in the cavity, shaping said sheet against the wall of the cavity to conform to the shape of said walls, applying suction to the cavity from the outside of the mold and through the mold parts, inserting foamable ingredients into the mold cavity, closing the mold, expanding the foaming ingredients to shape the foam product to the shape of the perforated plastic sheet, and maintaining the suction on said sheet until the foam has reached the gel state.

6. The molding method of claim 5, opening the mold after the foam has reached the gel state and applying fluid pressure to the perforated plastic sheet through the mold to aid in the removal of the shaped plastic sheet and the foam gel contained therein from the cavity.

7. In combination with a split breathable sprueless and lidless mold of material permeable to gaseous fluid, the mold comprising upper and lower parts having passages therethrough for gaseous fluid and of the type permitting removal of newly molded polyurethane therefrom before curing of the foam while the foam is still in the form of a gel, each of the parts of the mold being shaped to define a portion of a mold cavity, and expendible anticlogging means cooperating with the wall of the cavity for preventing the clogging of the passages at the walls of the cavity while permitting the escape of gaseous fluid out of the cavity and out of the interior of said means and into the passages prior to the removal of the newly molded polyurethane foam from the mold cavity, said means comprising an expendible and temporary cavity liner sheet of flexible plastic material having perforations therethrough at selected points thereof, the perforations being of insufficient diameter to permit the passage therethrough of the newly molded foam but permitting the passage therethrough and into the passages of the mold, of gaseous fluid from the cavity, said sheet initially constituting a removable mold release agent for the walls of the cavity, and said passages being cloggable by the foam material cast in the mold in the absence of said liner sheet, and means for applying suction to said passages while the liner sheet is across the walls of the cavity to aid in the evacuating movement of gaseous fluid out of the cavity and through said passages.

8. The combination of claim 7, the means for applying suction also functioning to apply fluid pressure to the plastic liner sheet through the passages of the mold after the foam generated in the cavity has reached the gel state and the mold has been opened, thereby to aid in the removal of the shaped liner sheet together with the foam gel contained therein from the mold and to prepare the cavity walls for contact with a succeeding similar liner sheet.

9. The combination of claim 7, the lower portion of the plastic liner sheet being imperforate and the perforations in the upper part of said sheet being largely concentrated at the highest and marginal portions of the top surface of said sheet.

10. The combination of claim 7, and an additional sheet of flexible material interposed between the liner sheet and at least the upper part of the wall of the cavity and in contact with said wall.

11. The combination of claim 7, the perforations being not less than 0.00025 inch in diameter.

12. The combination of claim 10, the plastic liner sheet having additional perforations therethrough in spaced relation to each other at selected points, each additional perforation being of a diameter larger than that of the smaller perforations first mentioned and sufficient to permit the passage therethrough of a limited amount of foam from the cavity while the foam is still adhesive, the additional sheet being of cushion covering material arranged in position to cover the larger additional perforations and adapted to become adhesively attached to the plastic liner sheet at, and by means of, the foam passing through said larger perforations.

13. The combination of claim 10, the additional sheet being of absorbent paper.

14. The combination of claim 12, the larger perforations being not greater than 0.25 inch in diameter.

15. The molding method of claim 1, and holding the plastic sheet against movement relatively to the wall of the cavity during the expansion of the foaming ingredients in the cavity, by means of said suction.

References Cited

UNITED STATES PATENTS

| 2,858,572 | 11/1958 | Burdick | 264—45 |
|---|---|---|---|
| 2,898,634 | 8/1959 | Alderfer | 264—47 |
| 2,955,972 | 10/1960 | Wintermute et al. | 264—45 |
| 3,078,508 | 2/1963 | Martin | 264—90 XR |
| 3,080,613 | 3/1963 | Wall et al. | 264—54 |
| 3,082,486 | 3/1963 | Khawam et al. | 264—45 |
| 3,137,743 | 6/1964 | Pelley | 264—47 |
| 3,253,064 | 5/1966 | Buonaiuto | 264—45 |
| 3,258,511 | 6/1966 | McGregor | 264—45 |

FOREIGN PATENTS 211,422   10/1957   Australia.

JULIUS FROME, Primary Examiner.

PHILIP E. ANDERSON, Assistnat Examiner.

U.S. Cl. X.R.

18—5; 249—113, 141; 264—54, 90, 338